US011996260B2

(12) United States Patent
Allaedini

(10) Patent No.: US 11,996,260 B2
(45) Date of Patent: May 28, 2024

(54) GRAPHITE X-RAY WINDOW

(71) Applicant: Moxtek, Inc., Orem, UT (US)

(72) Inventor: Ghazaleh Allaedini, Orem, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

(21) Appl. No.: 18/479,515

(22) Filed: Oct. 2, 2023

(65) Prior Publication Data

US 2024/0029990 A1 Jan. 25, 2024

Related U.S. Application Data

(63) Continuation of application No. 17/887,713, filed on Aug. 15, 2022, now Pat. No. 11,817,288.

(60) Provisional application No. 63/243,846, filed on Sep. 14, 2021.

(51) Int. Cl.
*H01J 35/18* (2006.01)
*H01J 5/18* (2006.01)

(52) U.S. Cl.
CPC ................ *H01J 35/18* (2013.01); *H01J 5/18* (2013.01); *H01J 2235/183* (2013.01)

(58) Field of Classification Search
CPC ......... H01J 5/18; H01J 35/18; H01J 2235/183
See application file for complete search history.

(56) References Cited

U.S. PATENT DOCUMENTS

2013/0051535 A1* 2/2013 Davis ........................ H01J 5/18
264/400
2013/0094629 A1* 4/2013 Liddiard ................ H01J 35/18
378/140

* cited by examiner

*Primary Examiner* — Anne M Hines
(74) *Attorney, Agent, or Firm* — Thorpe North & Western, LLP.

(57) ABSTRACT

The x-ray windows herein can have low gas permeability, low outgassing, high strength, low visible and infrared light transmission, high x-ray flux, low atomic number materials, corrosion resistance, high reliability, and low-cost. The x-ray window can include a film 11 with a polymer layer 22 and a graphite layer 21. The film 11 can consist essentially of graphite and polymer. Most of the film 11 can be the graphite layer 21. The polymer layer 22 can be a small portion of the film 11.

20 Claims, 4 Drawing Sheets

GRAPHITE X-RAY WINDOW

CLAIM OF PRIORITY

This is a continuation of U.S. patent application Ser. No. 17/887,713, filed Aug. 15, 2022; which claims priority to U.S. Provisional Patent Application No. 63/243,846, filed on Sep. 14, 2021, which are incorporated herein by reference.

FIELD OF THE INVENTION

The present application is related to x-ray windows.

BACKGROUND

X-ray windows are designed to transmit a high percent of x-rays, including low energy x-rays. X-ray windows are used in expensive systems requiring high reliability. High system requirements result in demanding characteristics of the x-ray window.

BRIEF DESCRIPTION OF THE DRAWINGS

Drawings Might not be Drawn to Scale

DEFINITIONS

Figure 1:
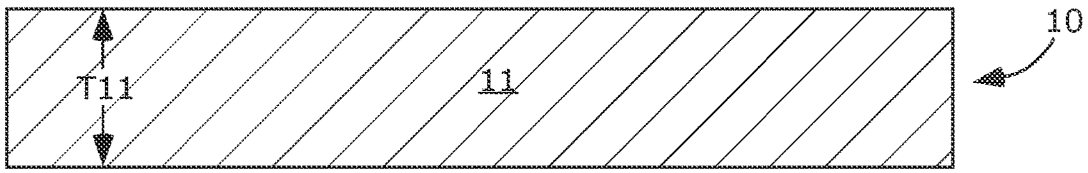
FIG. 1 is a cross-sectional side-view of an x-ray window 10 with a film 11. The film 11 can be made mostly of carbon, such as graphite.

The following definitions, including plurals of the same, apply throughout this patent application.

As used herein, the terms "on", "located on", "located at", and "located over" mean located directly on or located over with some other solid material between. The terms "located directly on", "adjoin", "adjoins", and "adjoining" mean direct and immediate contact.

As used herein, the term "nm" means nanometer(s) and the term "μm" means micrometer(s).

DETAILED DESCRIPTION

Useful characteristics of x-ray windows include low gas permeability, low outgassing, high strength, low visible and infrared light transmission, high x-ray flux, low atomic number materials, corrosion resistance, high reliability, and low-cost. Each x-ray window design is a balance between these characteristics.

An x-ray window can combine with a housing to enclose an internal vacuum. The internal vacuum can aid device performance. For example, an internal vacuum for an x-ray detector (a) minimizes gas attenuation of incoming x-rays and (b) allows easier cooling of the x-ray detector.

Permeation of a gas through the x-ray window can degrade the internal vacuum. Thus, low gas permeability is a desirable x-ray window characteristic.

Outgassing from x-ray window materials can degrade the internal vacuum of the device. Thus, selection of materials with low outgassing is useful.

The x-ray window can face vacuum on one side and atmospheric pressure on an opposite side. Therefore, the x-ray window may need strength to withstand this differential pressure.

Visible and infrared light can cause undesirable noise in the x-ray detector. The ability to block transmission of visible and infrared light is another useful characteristic of x-ray windows.

High x-ray flux through the x-ray window allows (a) rapid functioning of the x-ray detector and (b) increased x-ray flux out of an x-ray tube. Therefore, high x-ray transmissivity through the x-ray window is useful.

Detection and analysis of low-energy x-rays is needed in some applications. High transmission of low-energy x-rays is thus another useful characteristic of x-ray windows.

X-rays can be used to analyze a sample. X-ray noise from surrounding devices, including from the x-ray window, can interfere with a signal from the sample. X-ray noise from high atomic number materials are more problematic. It is helpful, therefore, for the x-ray window to be made of low atomic number materials.

X-ray windows are used in corrosive environments, and may be exposed to corrosive chemicals during manufacturing. Thus, corrosion resistance is another useful characteristic of an x-ray window.

X-ray window failure is intolerable in many applications. For example, x-ray windows are used in analysis equipment on Mars. High reliability is a useful x-ray window characteristic.

X-ray window customers demand low-cost x-ray windows with the above characteristics. Reducing x-ray window cost is another consideration.

The x-ray windows 10 described herein, and x-ray windows manufactured by the methods described herein, can have these useful characteristics (low gas permeability, low outgassing, high strength, low visible and infrared light transmission, high x-ray flux, low atomic number materials, corrosion resistance, high reliability, and low-cost). Each example may satisfy one, some, or all of these useful characteristics.

As illustrated in FIGS. 1-4, an x-ray window 10 is shown including a film 11. The film 11 can be planar across its entire width. The film 11 can include graphite and polymer. The film 11 can include other materials. Preferably, the film 11 is solely graphite, mostly graphite, or graphite plus a thin layer of polymer. The film 11 can be made mostly or solely of carbon. The film 11 can consist of carbon, hydrogen, nitrogen, and oxygen.

The film 11 can have ≥70, ≥80, ≥85, ≥90, ≥95, or ≥99 mass percent carbon. The film 11 can have ≤99, ≤99.5, or ≤99.9 mass percent carbon. The mass percent carbon value ranges of this paragraph can be such value ranges across the entire film 11 or across an aperture 32 or 42 of a frame 31 or housing 41 (see FIGS. 3 and 4).

The film 11 can be thin to improve x-ray transmission. For example, the film 11 can have a maximum thickness T11 that is in one of the following ranges: T11≤15 μm, T11≤25 μm, T11≤50 μm, T11≤100 μm, or T11≤400 μm.

Figure 3:
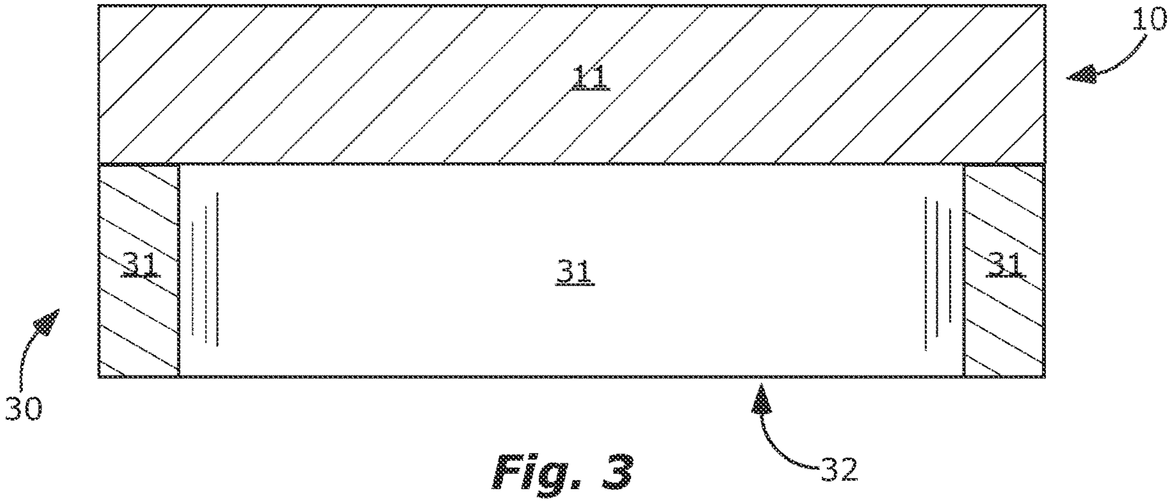
FIG. 3 is a cross-sectional side-view of an x-ray device 30 comprising an x-ray window 10 mounted to a frame 31. The x-ray window 10 can include a film 11 spanning an aperture 32 of the frame 31.
Figure 4:
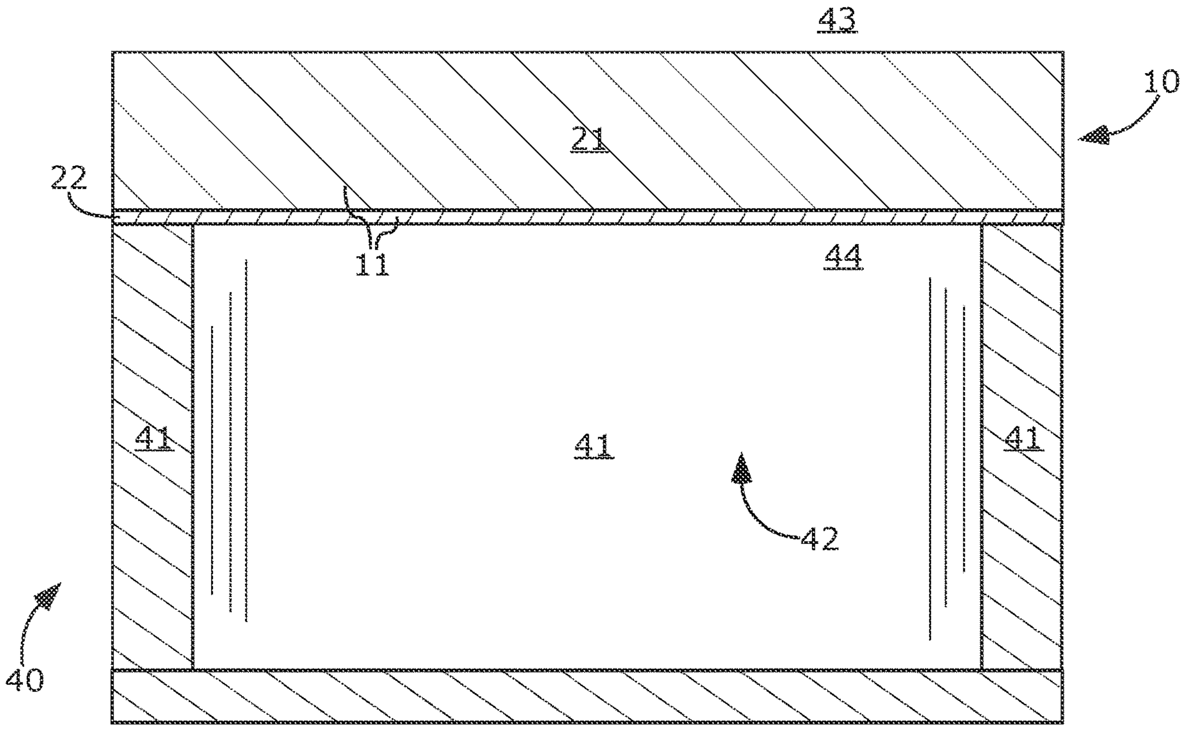
FIG. 4 is a cross-sectional side-view of an x-ray device 40 comprising an x-ray window 10 mounted on a housing 41. The x-ray window 10 can include a film 11 spanning an aperture 42 of the housing 41. The film 11 can include a polymer layer 22 facing a vacuum at an interior 44 of the housing 41, and a graphite layer 21 facing ambient pressure at an exterior 43 of the housing 41.

The film 11 can be thick to provide sufficient strength to span an aperture 32 or 42 (see FIGS. 3 & 4). For example, the film 11 can have a maximum thickness T11 that is in one of the following ranges: 1 μm≤T11, 3 μm≤T11, 5 μm≤T11, or 8 μm≤T11.

The maximum thickness T11 value ranges of the prior two paragraphs can be such value ranges across the entire film 11 or just across a portion spanning an aperture 32 (see FIG. 3).

Figure 2:
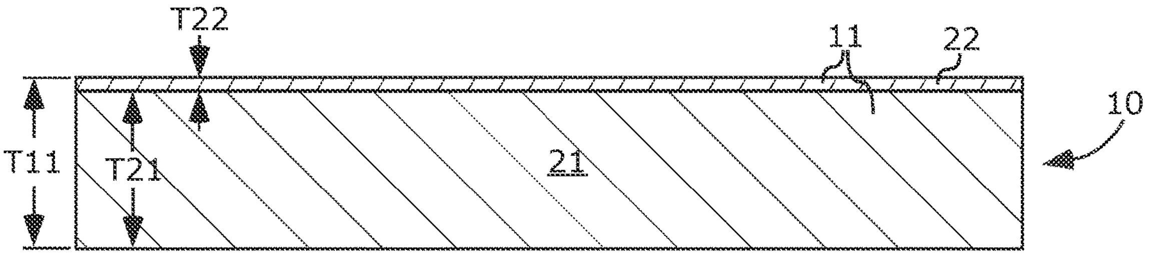
FIG. 2 is a cross-sectional side-view of an x-ray window 10 with a film 11. The film 11 can include a polymer layer 22 and a graphite layer 21.

As illustrated in FIG. 2, the film 11 can include a polymer layer 22 on a graphite layer 21. The polymer layer 22 can adjoin the graphite layer 21. The film 11 can consist essentially of graphite and polymer.

The graphite layer 21 can include ≥80, ≥85, ≥90, ≥95, ≥99, or ≥99.9 mass percent carbon. The polymer layer 22 can include polyimide.

The polymer layer 22 can be thinner than the graphite layer 21. For example, T21/T22>1, T21/T22≥10, T21/T22≥50, or T21/T22≥75, where T21 is a thickness of the graphite layer 21 and T22 is a thickness of the polymer layer 22. As another example, T21/T22≤150, T21/T22≤200, T21/T22≤500, or T21/T22≤1000. Example thicknesses of the graphite layer 21 include 1 μm≤T21, 2 μm≤T21, 5 μm≤T21, or 10 μm≤T21; and T21≤14 μm, T21≤20 μm, T21≤40 μm, T21≤60 μm, or T21≤100 μm. Example thicknesses of the polymer layer 22 include 10 nm≤T22, 20 nm≤T22, 50 nm≤T22, or 80 nm≤T22; and T22≤120 nm, T22≤250 nm, T22≤500 nm, or T22≤2 μm.

Combining a thick graphite layer 21 with a very thin polymer layer 22 is preferred for achieving the characteristics desirable described above. These characteristics are preferably achieved by a film 11 that consists essentially of the graphite layer 21 and the polymer layer 22. These characteristics are preferably achieved through the method described below.

As illustrated in FIG. 3, x-ray device 30 can comprise an x-ray window 10 mounted to a frame 31. The x-ray window 10 can include a film 11, as described above. The film 11 can span an aperture 32 of the frame 31. The aperture 32 can be void of solid material except for the film 11. The film 11 can be the only solid structure spanning the aperture 32 of the frame 31.

As illustrated in FIG. 4, x-ray device 40 can comprise an x-ray window 10 mounted to a housing 41. The x-ray window 10 can include a film 11, as described above. The film 11 can span an aperture 42 of the housing 41. The aperture 42 can consist essentially of the film 11. The film 11 can be the only solid structure spanning the aperture 42 of the housing 41.

An interior 44 of the housing 41 can be a vacuum. An exterior 43 of the housing 41 can be ambient pressure. The film 11 can include a polymer layer 22 facing the vacuum at the interior 44, and a graphite layer 21 facing the ambient pressure at the exterior 43. This arrangement is preferred for reducing outgassing of material of the x-ray window 10 into the vacuum of the interior 44 of the housing 41.

Following are example characteristics of the film 11: T21/T22=120, T21=12 μm, T22=100 nm, T11=12.1 μm. The film 11 can have about 99.7% mass percent carbon. The polymer layer 22 can be polyimide. The film 11 can consist essentially of the graphite layer 21 and the polymer layer 22 across the aperture 42.

Method

Figure 5:
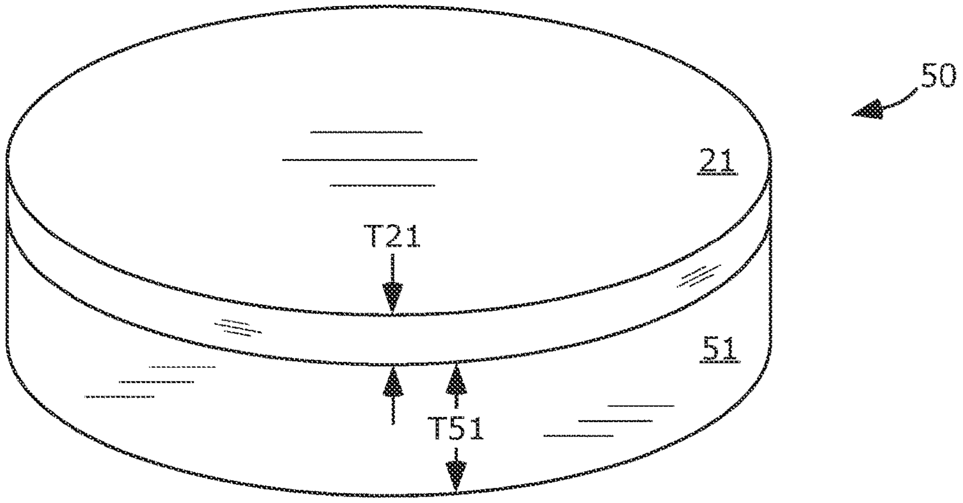
FIG. 5 is a perspective-view of a step 50 in a method of making an x-ray window, including obtaining a graphite layer 21 on a flexible substrate 51.

A method of making an x-ray window can include some or all of the following steps:

Step 50 (FIG. 5) includes obtaining a graphite layer 21 on a flexible substrate 51. The flexible substrate 51 can include vinyl or polyethylene terephthalate. A thickness T51 of the flexible substrate 51 divided by a thickness T21 of the graphite layer 21 can be at least 2 and not greater than 20 (2≤T51/T21≤20). One example of a graphite layer 21 on a flexible substrate 51 is DSN5012 by DASEN/thermalgraphite.com.

Figure 6:
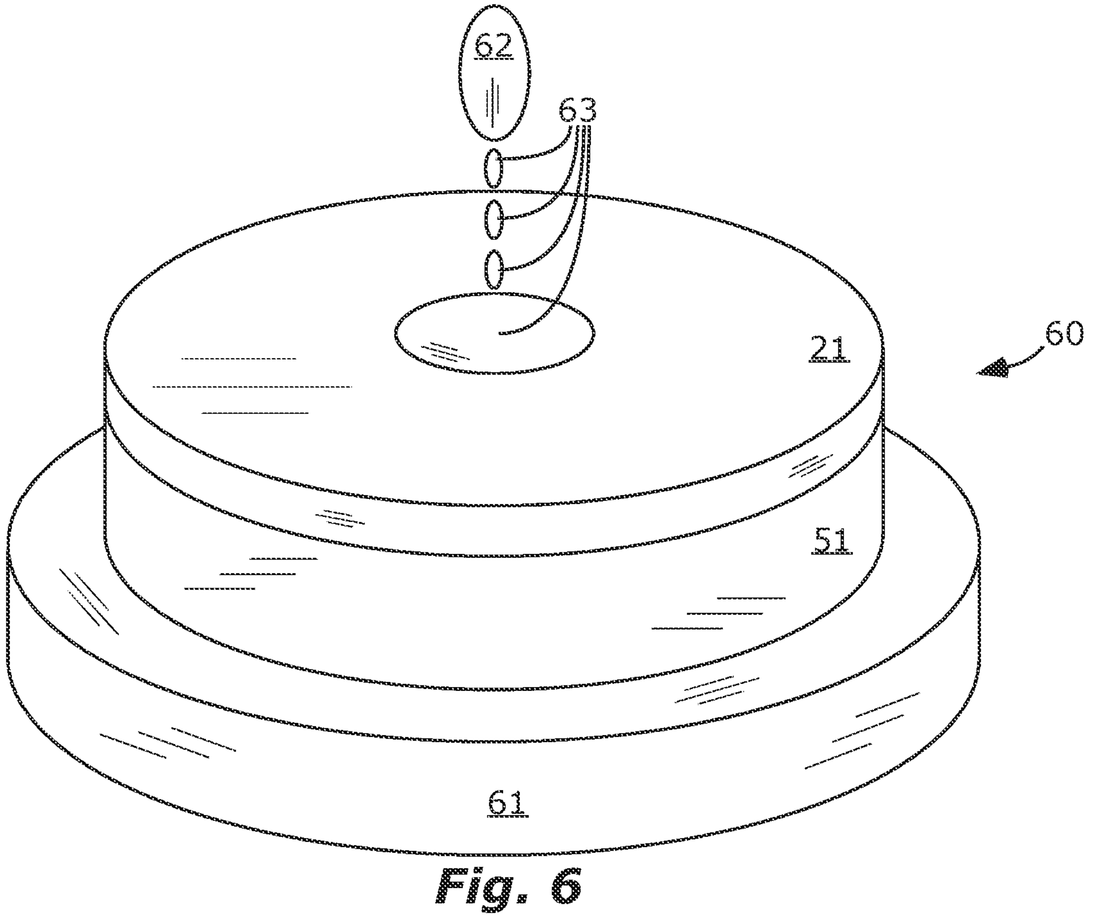
FIG. 6 is a perspective-view of a step 60 in a method of making an x-ray window, including spin coating a polymer precursor 63 on the graphite layer 21.

Step 60 (FIG. 6) includes spin coating a polymer precursor 63 on the graphite layer 21. A dispenser 62 of the polymer precursor 63 is shown in FIG. 6. This can be a pipette or syringe for manual application, or it can be a dropper of an automated tool. The flexible substrate 51 can face a spin coat tool 61 and the graphite layer 21 can face away from the spin coat tool 61. A spin plate on the spin coat tool 61 can comprise silicon. The flexible substrate 51 can adjoin the silicon spin plate.

The polymer precursor 63 can include an imide dissolved in N-methyl-2-pyrrolidone. The imide can be biphenyldianhydride/1,4 phenylenediamine. A volume of the N-methyl-2-pyrrolidone divided by a volume of the imide can be ≥1.5 and ≤6. Baking step 70 can form the imide into a polyimide in the polymer layer 22.

Figure 7:
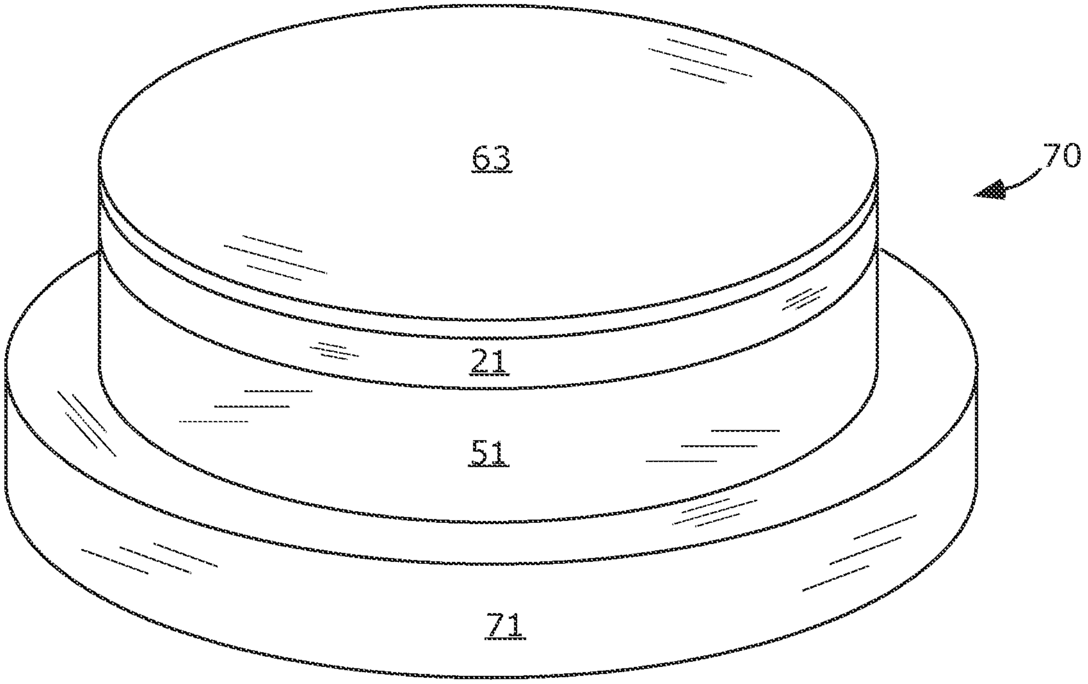
FIG. 7 is a perspective-view of a step 70 in a method of making an x-ray window, including baking the flexible substrate 51, the graphite layer 21, and the polymer precursor 63 to form a polymer layer 22 (see FIG. 8) on the graphite layer 21.

Step 70 (FIGS. 7-8) includes baking the graphite layer 21 and the polymer precursor 63 to form a polymer layer 22 on the graphite layer 21. A hot plate 71 is shown in FIG. 7 for this baking step. The flexible substrate 51 can face the hot plate 71. Alternatively, an oven may be used.

Figure 8:
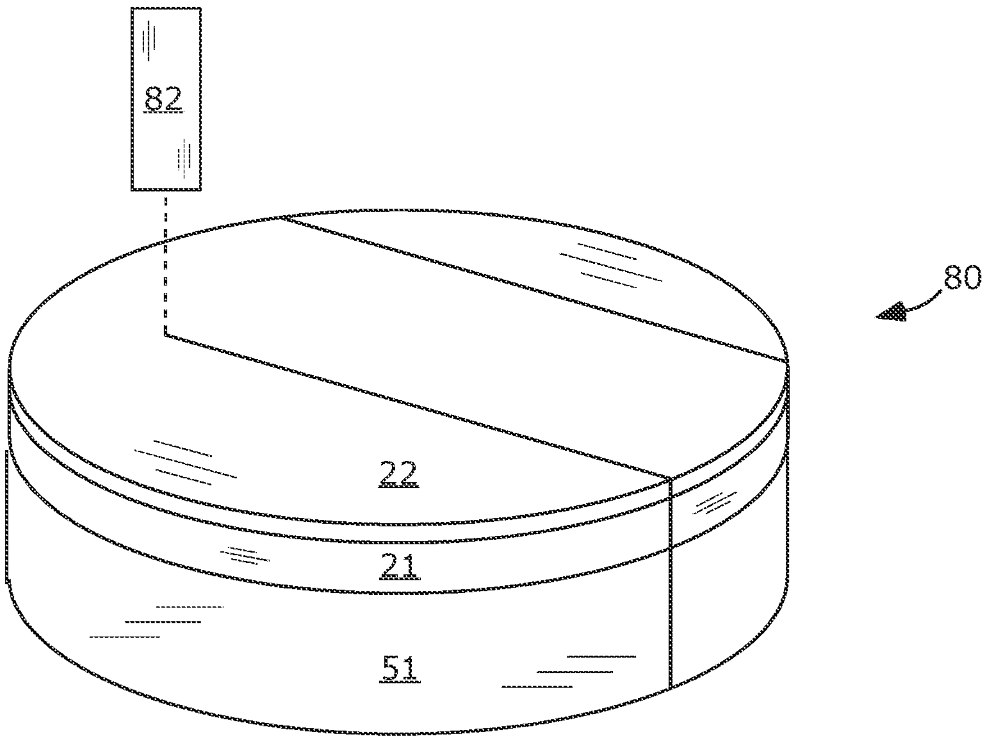
FIGS. 8-9 are perspective-views of steps 80-90 in a method of making an x-ray window, including laser cutting the polymer layer 22, the graphite layer 21, and the flexible substrate 51 to form multiple x-ray windows.

The polymer precursor 63 is shown in FIG. 7, which is formed into the polymer layer 22 by the bake, as shown in FIG. 8. In step 70, baking can also include baking the flexible substrate 51.

Figure 9:
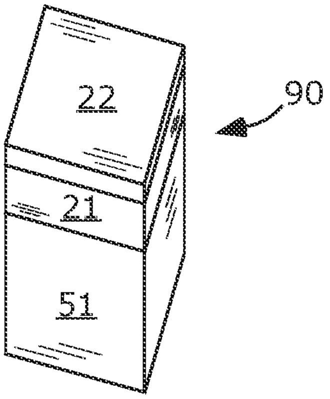

Steps 80-90 (FIGS. 8-9) include laser cutting the polymer layer 22 and the graphite layer 21 to form multiple x-ray windows. In steps 80-90, the polymer layer 22 and the graphite layer 21 can be cut together in a single step by the laser 82. The flexible substrate 51 can also be cut together with the polymer layer 22 and the graphite layer 21 by the laser 82. An Nd:YAG laser may be used to cut the polymer layer 22, the graphite layer 21, and the flexible substrate 51.

Figure 10:
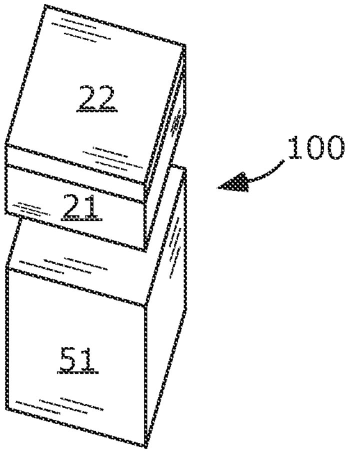
FIG. 10 is a perspective-view of a step 100 in a method of making an x-ray window, including removing the flexible substrate 51 from the graphite layer 21.

Step 100 (FIG. 10) includes removing the flexible substrate 51 from the graphite layer 21. In step 100, the flexible substrate 51 can be removed from the graphite layer 21 by manually peeling it off. Plastic-tip tweezers are preferred. The flexible substrate 51 can be removed (step 100) from the graphite layer 21 after baking (step 70), after cutting (steps 80-90), or after both. Performing steps 70, 80, 90, and 100 in this order can reduce the chance of damage to the film 11.

The steps of the method can be performed in the above order, or other order if so specified in the claims. Some of the steps can be performed simultaneously unless explicitly noted otherwise in the claims. Components of the x-ray window, made by this method, can have properties as described above the method description.

Here are steps of one example method: DSN5012 is used for the graphite layer 21 and the flexible substrate 51. The flexible substrate 51 is a 75 μm thick layer of polyethylene terephthalate. The graphite layer 21 is 12 μm thick. The polymer precursor 63 is biphenyldianhydride/1,4 phenylenediamine dissolved in N-methyl-2-pyrrolidone, in a 1:3 ratio. A spin coat tool 61 with a silicon wafer is used, with the flexible substrate 51 adjoining the silicon wafer. The film 11 is baked on a hot plate about 80° C. for 10 minutes, then left to cure for 24 hours at room temperature. The film 11 is then laser cut by an Nd:YAG laser. Tweezers are then used to peel the flexible substrate 51 off of the graphite layer 21.

What is claimed is:

1. A method of making an x-ray window, the method comprising:
- obtaining a graphite layer on a flexible substrate;
- spin coating a polymer precursor on the graphite layer;
- baking the graphite layer and the polymer precursor to form a polymer layer on the graphite layer; and
- removing the flexible substrate from the graphite layer.

2. The method of claim 1, further comprising, after baking the graphite layer and the polymer precursor, laser cutting the polymer layer and the graphite layer to form multiple x-ray windows.

3. The method of claim 2, wherein the polymer layer and the graphite layer are cut together in a single step by a laser.

4. The method of claim 1, wherein removing the flexible substrate from the graphite layer includes manually peeling the flexible substrate with plastic-tip tweezers.

5. The method of claim 1, wherein the polymer precursor includes an imide dissolved in N-methyl-2-pyrrolidone.

6. The method of claim 5, wherein a volume of the n-methyl-2-pyrrolidone divided by a volume of the imide is ≥1.5 and ≤6.

7. The method of claim 5, wherein the imide is biphenyldianhydride/1,4 phenylenediamine.

8. The method of claim 5, wherein baking the graphite layer and the polymer precursor forms the imide into a polyimide in the polymer layer.

9. The method of claim 1, wherein the flexible substrate includes polyethylene terephthalate.

10. The method of claim 1, wherein:
- the spin coating step includes spin coating with the flexible substrate facing a spin coat tool and the graphite layer facing away from the spin coat tool;
- the baking step includes baking the flexible substrate; and
- the method is performed in the order listed in claim 1.

11. The method of claim 10, wherein the flexible substrate adjoins a silicon spin plate on the spin coat tool and the spin plate comprises silicon.

12. The method of claim 1, wherein a thickness of the flexible substrate divided by a thickness of the graphite layer ≥2 and ≤20.

13. The method of claim 1, further comprising, after baking and before removing the flexible substrate from the graphite layer, laser cutting the polymer layer, the graphite layer, and the flexible substrate together to form multiple x-ray windows.

14. The method of claim 1, wherein the flexible substrate includes vinyl.

15. A method of making an x-ray window, the method comprising:
- obtaining a graphite layer on a flexible substrate;
- spin coating a polymer precursor on the graphite layer, wherein the polymer precursor includes biphenyldianhydride/1,4 phenylenediamine, dissolved in N-methyl-2-pyrrolidone and the polymer layer includes polyimide;
- baking the graphite layer and the polymer precursor to form a polymer layer including polyimide on the graphite layer; and
- laser cutting the polymer layer and the graphite layer to form multiple x-ray windows.

16. The method of claim 15, wherein the polymer layer and the graphite layer are cut together in a single step by a laser.

17. The method of claim 15, wherein a volume of the n-methyl-2-pyrrolidone divided by a volume of the biphenyldianhydride/1,4 phenylenediamine is ≥1.5 and ≤6.

18. A method of making an x-ray window, the method comprising the following steps in the following order:
- obtaining a graphite layer on a flexible substrate, and the flexible substrate includes polyethylene terephthalate;
- spin coating a polymer precursor on the graphite layer with the flexible substrate facing a spin coat tool and the graphite layer facing away from the spin coat tool; and
- baking the graphite layer and the polymer precursor to form a polymer layer on the graphite layer.

19. The method of claim 18, wherein the flexible substrate adjoins a silicon spin plate on the spin coat tool and the spin plate comprises silicon.

20. The method of claim 18, wherein a thickness of the flexible substrate divided by a thickness of the graphite layer ≥2 and ≤20.

* * * * *